United States Patent
Iyer et al.

(10) Patent No.: US 8,248,927 B2
(45) Date of Patent: Aug. 21, 2012

(54) VLAN POOLING

(75) Inventors: Pradeep Iyer, Cupertino, CA (US);
John Richard Taylor, Tiburon, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 854 days.

(21) Appl. No.: 11/236,006

(22) Filed: Sep. 27, 2005

(65) Prior Publication Data

US 2007/0071010 A1 Mar. 29, 2007

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 12/28* | (2006.01) |

(52) U.S. Cl. ............ 370/230; 370/310.2; 370/328; 370/341; 370/392; 370/395.31; 370/401; 370/409; 370/410; 370/437

(58) Field of Classification Search .......... 370/310–327, 370/395.2
See application file for complete search history.

(56) References Cited

U.S. PATENT DOCUMENTS

| | | | | |
|---|---|---|---|---|
| 5,978,378 | A * | 11/1999 | Van Seters et al. | 370/401 |
| 7,006,431 | B1 * | 2/2006 | Kanekar et al. | 370/217 |
| 7,099,276 | B1 * | 8/2006 | Kalkunte et al. | 370/230.1 |
| 7,190,695 | B2 | 3/2007 | Schaub et al. | |
| 7,194,622 | B1 * | 3/2007 | Halasz et al. | 713/163 |
| 7,339,915 | B2 | 3/2008 | Jakkahalli et al. | |
| 7,355,977 | B1 * | 4/2008 | Li | 370/235.1 |
| 7,447,166 | B1 * | 11/2008 | Kaluve et al. | 370/254 |
| 7,450,595 | B1 | 11/2008 | Killian | |
| 7,606,916 | B1 * | 10/2009 | Potter et al. | 709/229 |
| 7,613,150 | B2 * | 11/2009 | Nagarajan et al. | 370/331 |
| 2003/0035398 | A1 * | 2/2003 | Sato | 370/338 |
| 2006/0268765 | A1 * | 11/2006 | Bajic et al. | 370/328 |
| 2007/0002833 | A1 * | 1/2007 | Bajic | 370/352 |

* cited by examiner

*Primary Examiner* — Nishant B Divecha
(74) *Attorney, Agent, or Firm* — Blakely, Sokoloff, Taylor & Zafman LLP (57) ABSTRACT

According to one embodiment of the invention, a method for forming groups of network device within a network comprises (i) obtaining a source media access control (MAC) address for a network device and (ii) assigning the network device to a virtual local area network based on the source MAC address and a total number of virtual local area networks supported by a network.

30 Claims, 5 Drawing Sheets

VLAN POOLING

FIELD

Embodiments of the invention relate to the field of communications, in particular, to a system and apparatus for regulating the assignment of network devices to virtual local area networks (VLANs).

GENERAL BACKGROUND

Over the last decade or so, companies have installed enterprise networks with one or more local area networks in order to allow their employees access to various network resources. To improve efficiency, enhancements have been added to local area networks such as wireless access. Based on this enhancement, wireless local area networks (WLANs) have been and continue to be utilized by more and more companies.

Typically, a WLAN supports communications between wireless stations (STAs) and Access Points (APs). In general, each AP operates as a relay station by supporting communications with other network devices, such as wireless stations and other APs being part of a wireless network, as well as with resources on a wired network.

Currently, sub-networks (referred to as "subnets") have been created in order to direct multicast and broadcast transmissions from an AP to smaller groups of wireless stations. One well-established network configuration used by WLAN is referred to as "/24," where approximately 250 network devices can be grouped as part of the same virtual local area network (VLAN). In general, a "VLAN" is a logical subgroup within a local area network (e.g., WLAN) that is created via software rather than manually moving cables in the wiring closet. It combines network devices, such as a plurality of wireless stations (STAs) for example, into a single collective group regardless of its physical LAN segment.

While this network configuration technique is acceptable in a wired network since the stations are stationary, wireless stations can vary in physical location. Hence, in some situations, the number of stations at a specific location may exceed the number of wireless stations supported by a particular VLAN.

BRIEF DESCRIPTION OF THE DRAWINGS

The invention may best be understood by referring to the following description and accompanying drawings that are used to illustrate embodiments of the invention.

DETAILED DESCRIPTION

Embodiments of the invention relate to a system and apparatus for generally conducting virtual local area networks (VLAN) load balancing through an establishment of a pool (or group) of VLANs (hereinafter referred to as the "VLAN pool"). According to one embodiment of the invention, a station (STA) is assigned to a selected VLAN in the VLAN pool based on operations performed on the media access control (MAC) address of the station and the total number of VLANs associated with the VLAN pool. This VLAN pooling embodiment is applicable to wired and wireless networks, albeit it especially solves problems unique to mobile networks. In short, one inventive aspect is directed to a method to allocate VLAN from a pool for a client based solely on its MAC Address.

More specifically, according to one embodiment of the invention, a source MAC address of a wireless message from the station (hereinafter referred to as the "STA MAC address") undergoes logical operations to produce a result. The logical operations may include Exclusive OR (XOR) operations on bytes of the STA MAC address. Thereafter, a Modulo operation is performed on the result and the total number of VLANs forming the VLAN pool in order to produce a VLAN pool index. The VLAN pool index uniquely assigns the station to a particular VLAN from the VLAN pool.

Herein, according to one embodiment, the invention may be applicable to a variety of wired or wireless networks. Examples of wireless networks include, but are not limited or restricted to wireless local area network (WLAN) or wireless personal area network (WPAN). The wireless network may be configured in accordance with any current or future wireless communication protocols. Examples of various types of wireless communication protocols include, but are not limited or restricted to the following: Institute of Electrical and Electronics Engineers (IEEE) 802.11 standards, High Performance Radio Local Area Networks (HiperLAN) standards, WiMax (IEEE 802.16) and the like. For instance, the IEEE 802.11 standard may an IEEE 802.11b standard entitled "Wireless LAN Medium Access Control (MAC) and Physical Layer (PHY) specifications: Higher-Speed Physical Layer Extension in the 2.4 GHz Band" (IEEE 802.11b, 1999); an IEEE 802.11a standard entitled "Wireless LAN Medium Access Control (MAC) and Physical Layer (PHY) specifications: High-Speed Physical Layer in the 5 GHz Band" (IEEE 802.11a, 1999); a revised IEEE 802.11 standard "Wireless LAN Medium Access Control (MAC) and Physical Layer (PHY) specifications" (IEEE 802.11, 1999); or an IEEE 802.11g standard entitled ""Wireless LAN Medium Access Control (MAC) and Physical Layer (PHY) specifications: Further Higher Data Rate Extension in the 2.4 GHz Band" (IEEE 802.11g, 2003).

Certain details are set forth below in order to provide a thorough understanding of various embodiments of the invention, albeit the invention may be practiced through many embodiments other that those illustrated. Well-known logic and operations are not set forth in detail in order to avoid unnecessarily obscuring this description.

In the following description, certain terminology is used to describe features of the invention. For example, the terms "logic" and "logical processing unit" are generally defined as hardware and/or software module(s) that are configured to perform one or more logical or arithmetic operations. Examples of logical operations involve bit manipulation and may include, but are not limited or restricted to the following: AND, OR, Exclusive OR (XOR), inversion or any combination thereof. An example of an arithmetic operation includes a Modulo computation.

As hardware, logical processing unit may include a processor, a programmable gate array, combinatorial logic, a controller, or the like. As software, the functionality of the logical processing unit may be supplied by executing one or more software modules, which is executable code such as an application, an applet, a routine or one or more instructions. Software modules may be stored in any type of memory, namely suitable storage medium such as a programmable electronic circuit, a semiconductor memory device, a volatile memory (e.g., random access memory, etc.), a non-volatile memory (e.g., read-only memory, flash memory, a hard drive, etc.), a portable memory device (e.g., floppy diskette, a compact disk "CD", digital versatile disc "DVD", a tape, a Universal Serial Bus "USB" flash drive), or the like.

A "network device" includes a station (e.g., any data processing equipment such as a computer, cellular phone, personal digital assistant, etc.), an Access Point, data transfer devices (e.g., a network switch), or the like. An "interconnect" is generally defined as a communication pathway established over an information-carrying medium. The interconnect may be a wired interconnect, where the medium is a physical medium (e.g., electrical wire, optical fiber, cable, bus traces, etc.), a wireless interconnect (e.g., air in combination with wireless signaling technology) or a combination of these technologies.

"Information" is defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

I. Network Architecture and Message Format

Figure 1:
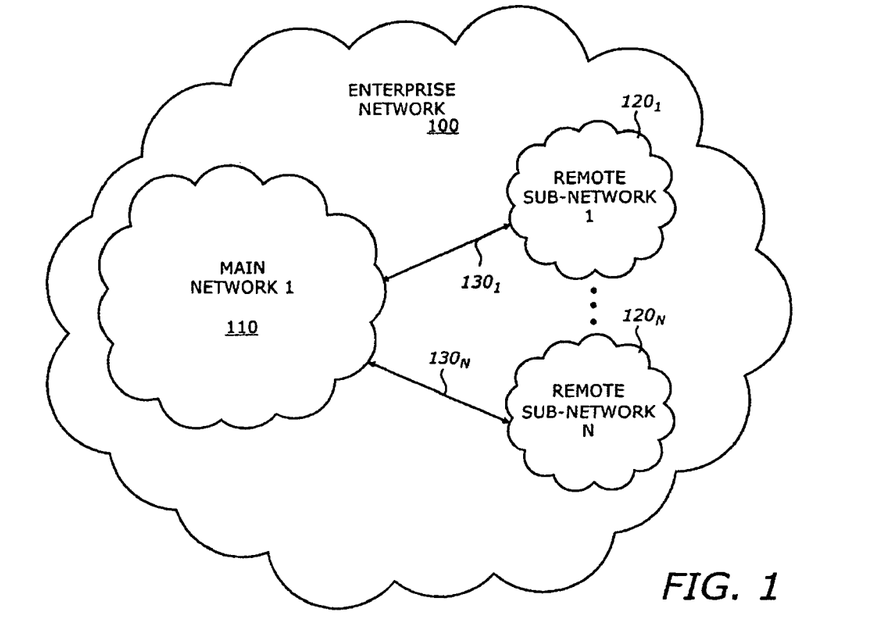
FIG. 1 is an exemplary embodiment of an enterprise network.

Referring to FIG. 1, an exemplary embodiment of an enterprise network 100 is shown. In accordance with one embodiment of the invention, a main network 110 operates as a private network, which includes at least one local area network. The local area network may be adapted with an enhancement that allows wireless access, thereby operating as a wireless local area network (WLAN).

One or more sub-networks $120_1$-$120_N$ (where $N \geq 1$) are remotely located from main network 110 and are in communication via interconnect 130. According to one embodiment of the invention, communications are established between main network 110 and remote sub-networks $120_1$-$120_N$ via interconnects $130_1$-$130_N$, respectively. It is contemplated, however, that sub-networks $120_1$-$120_N$ may be in multicast communications with main network 110.

Figure 2:
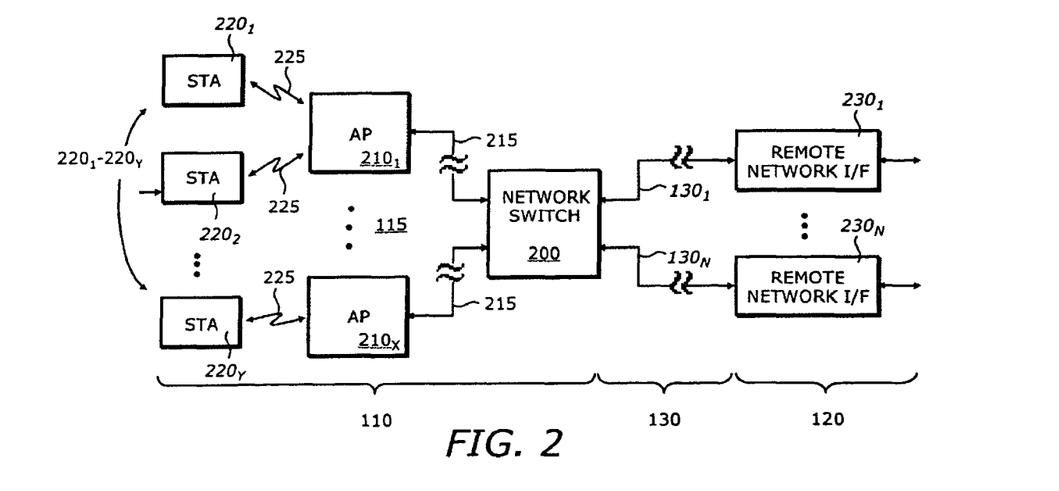
FIG. 2 is a detailed exemplary embodiment of the enterprise network of FIG. 1 with a wireless local area network operating in accordance with the invention.

Referring now to FIG. 2, a detailed, exemplary embodiment of enterprise network 100 of FIG. 1 is illustrated. According to this embodiment of the invention, main network 110 features a WLAN 115 that comprises a network switch 200 (e.g., WLAN switch) in communication with one or more access points (APs) $210_1$-$210_X$ (where $X \geq 1$, $X=2$ for this embodiment) over an interconnect 215. Interconnect 215 may be established using a wired and/or wireless information-carrying medium and provides either a direct or indirect communication path between APs $210_1$-$210_X$ and network switch 200. In addition, one or more wireless stations, identified as STAs $220_1$-$220_Y$ (where $Y \geq 1$, $Y=3$ for this embodiment), are in communication with APs $210_1$-$210_X$ over wireless interconnects 225.

More specifically, for this embodiment of the invention, each AP $210_1$, or $210_2$ supports bi-directional communications by receiving wireless messages from any or all of the STAs $220_1$-$220_Y$ within its coverage area and transferring information extracted from the wireless messages over interconnect 215 to which network switch 200 is coupled. Hence, STAs $220_1$-$220_Y$ are adapted to communicate with and provide information to any associated AP $210_1$, . . . , or $210_X$.

For instance, as shown as an illustrative embodiment of a network configuration, STAs $220_1$-$220_2$ may be associated with AP $210_1$, and communicates over the air in accordance with a selected wireless communications protocol. Hence, AP $210_1$, generally operates as a transparent bridge connecting together a wireless and wired network. Similarly, STA $220_3$ may be associated with AP $210_2$.

According to one embodiment, although not shown, STA $220_1$, comprises a removable, wireless network interface card (NIC) that is separate from or employed within a wireless device that processes information (e.g., computer, personal digital assistant "PDA", telephone, alphanumeric pager, etc.). Normally, the NIC comprises a wireless transceiver, although it is contemplated that the NIC may feature only receive (RX) or transmit (TX) functionality such that only a receiver or transmitter is implemented.

Although not shown, interconnect 215 provides connectivity for network resources such as servers for data storage, web servers or the like. These network resources are available for users of main network 110 of FIG. 1, albeit access may be restricted.

Network switch 200 comprises logic that supports bi-directional communications with APs $210_1$-$210_X$ over interconnect 215. Namely, network switch 200 receives messages from and transmitting messages to one or more targeted APs $210_1$, . . . , or $210_X$ over interconnect 215. According to one embodiment of the invention, interconnect 215 may be part of any type of wired network, including but not limited or restricted to Ethernet, Token Ring, Asynchronous Transfer Mode (ATM), or the like. As an example, upon receiving a wireless message, an AP (e.g., AP $210_1$) extracts information and places such information into an Ethernet frame for transmission to network switch 200.

Network switch 200 is further adapted to perform VLAN pooling operations based on information received from APs $210_1$-$210_X$ that originated from STAs $210_1$-$210_3$. For instance, network switch 200 may be configured to assign each STA $210_1$, $210_2$ or $210_3$ to a particular VLAN in order to establish broadcast/multicast domains for STAs $210_1$-$210_3$. This assignment is conducted independent of the physical location of the STA $210_1$, $210_2$ or $210_3$, but rather, is assigned to a selected VLAN based on the STA MAC address and the size of the VLAN pool as described below.

It is contemplated that a network switch is not required to calculate the VLAN from the VLAN pool. In certain embodiments, an Access Point can perform this VLAN pooling calculation. For instance, AP $210_1$, may be configured with a mode called "Branch Office AP," where traffic from STA $210_1$-$210_Y$ is not tunneled to network switch 200 at all.

Rather, it is decrypted and bridged to the sub-network directly by AP $210_1$. However, as described for illustrative purposes, the VLAN pooling operation will be described as when calculated by network switch 200.

Figure 3:
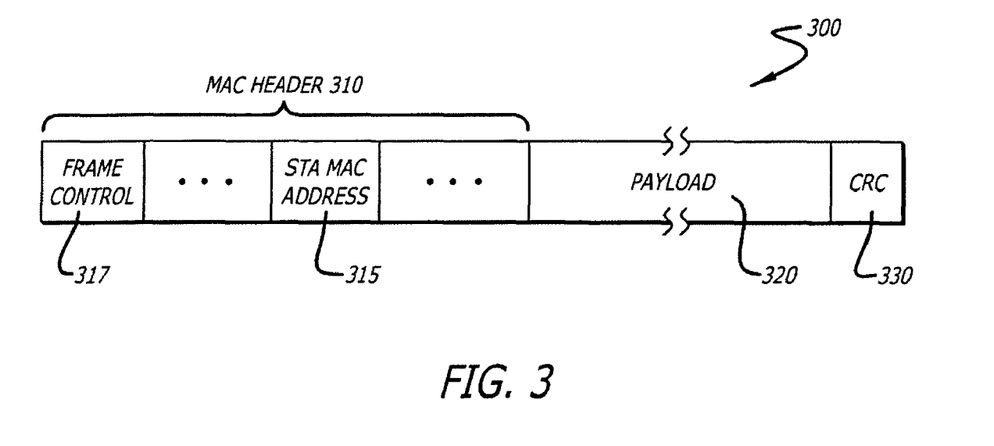
FIG. 3 is an exemplary embodiment of an Association Request produced by a station of FIG. 1 to establish communications with a corresponding Access Point.

Referring now to FIG. 3, an exemplary embodiment of an Association Request produced by a station (STA) of FIG. 1 to establish communications with a corresponding Access Point (AP) is shown. Wireless message 300 comprises a Media Access Control (MAC) header 310 including a source address that is used for VLAN pooling is shown. More specifically, wireless message 300 comprises MAC Header 310, a payload 320 and a cyclic redundancy check (CRC) 330.

As shown, MAC header 310 includes a source MAC address 315 (referred to as the "STA MAC address"), which is one of a plurality of addresses contained in MAC header 310. The location of STA MAC address 315 depends, in part, on the values of "To DS" and "From DS" bits within a frame control field 317 of MAC header 310. Herein, STA MAC address 315 includes a plurality of bytes, where each byte is represented by the label "b[i]," where "i" represents the byte number as shown in FIG. 4A.

II. VLAN Pooling Operation

A. General Exemplary Embodiment

Figure 4A:
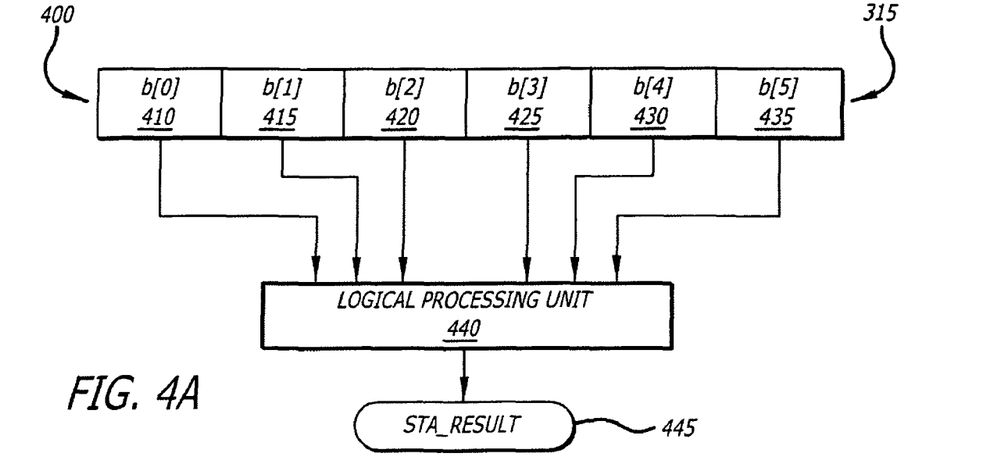
FIG. 4A is a general exemplary embodiment of a virtual local area network (VLAN) pooling operation performed by a network switch to generate a value used for assigning a particular station to a particular VLAN of a VLAN pool.

Referring now to FIG. 4A, a general exemplary embodiment of a virtual local area network (VLAN) pooling operation that is conducted by network switch 200 of FIG. 2 is shown. The VLAN pooling operation is directed to assigning different network devices to a particular VLAN of a group of VLANs (VLAN pool), irrespective of its physical location and based in part on the MAC address of the network device. As previously mentioned, the VLAN pooling operation may be conducted by a network switch or by an access point. When performed by the access point, the Association Request frame is handled in the AP itself, it is not tunneled to the network switch.

Once an AP of FIG. 2 receives a wireless message from a particular STA, such as an Association Request, information within the Association Request is routed to the network switch when the network switch performs the VLAN pooling operations. Such information includes some or all of the information contained in MAC header 310 of wireless message 300 of FIG. 3. From this information, STA MAC address 315 is extracted. As shown, STA MAC address 315 includes a plurality of bytes 400, such as bytes b[0] 410, b[1] 415, b[2] 420, b[3] 425, b[4] 430 and b[5] 435. These bytes 400 are processed by a logical processing unit 440.

More specifically, logical processing unit 440 is adapted to perform logical operations on information contained within STA MAC address 315. Such logical operations may be performed on a bitwise or multi-bit basis (e.g., nibble, byte, word, double word, etc.). As an example, XOR operations may be performed on STA MAC address 315 on a byte-wise basis as set forth in FIG. 5A described below. The result of these XOR operations produces a result (referred to as "STA_Result") 445.

As another example, XOR operations may be performed on successive nibbles (4-bit segments) forming STA MAC address 315 to produce STA_Result 445. For instance, a first nibble of byte b[0] 410 is XOR'ed with a second nibble of byte b[0] 410. The XOR result is XOR'ed with a first nibble of byte b[1] 415, which is then XOR'ed with a second nibble of byte b[1] 415. This successive logical process continues until the second nibble of byte b[5] 435 is XOR'ed with the prior computed XOR result associated with nibbles forming bytes b[0] 410 through b[4] 430 and a first nibble of byte b[5] 435.

Figure 4B:
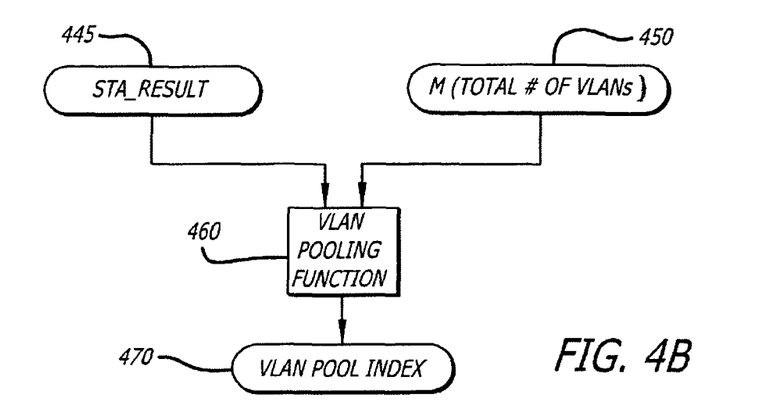
FIG. 4B is a general exemplary embodiment of an operation performed by the network switch to produce a VLAN pool index used for assigning VLANs to particular stations.

Referring now to FIG. 4B, a general exemplary embodiment of an operation performed by network switch 200 of FIG. 2 to produce a VLAN pool index 470 used for VLAN assignment is shown. Both STA_Result 445 and a value 450, representing the total number "M" (M≧1) of VLANs forming a VLAN pool, are input into a VLAN pooling logic unit 460. VLAN pooling logic unit 460 performs an arithmetic operation, such as a Modulo (MOD) operation as set forth in equation (1) below.

VLAN Pool Index=STA_Result MOD M         (1)

As shown, the arithmetic operation performed by VLAN pooling logic unit 460 produces VLAN Pool Index 470, which is equivalent to a remainder of STA_Result 445 divided by a total number of VLANs 465. Given that there are "M" VLANs in total, VLAN Pool Index 470 can range from "1" to "M−1". Hence, each potential value for VLAN Pool Index 470 uniquely corresponds to a VLAN from the VLAN pool, which is stored within a VLAN Assignment table 480 set forth in FIG. 4C.

Figure 4C:
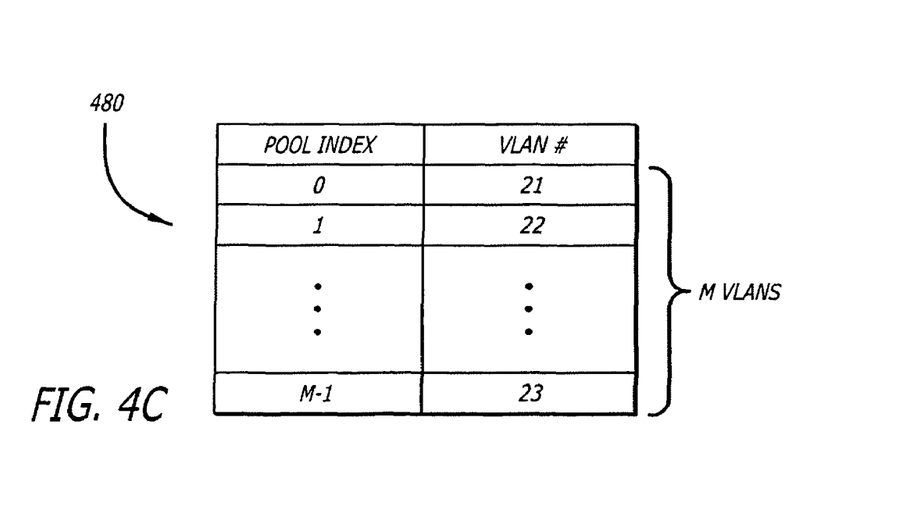
FIG. 4C is a general exemplary embodiment of VLAN Assignment table.

VLAN Assignment table 480 is used by network switch 200 to route all incoming multicast and broadcast messages from a particular station to other network devices within its VLAN. Also, table 480 may be used for unicast messages from the station such as when the message is an Ethernet message (i.e., VLAN identifier may be included in the Ethernet header).

B. Detailed Embodiment

Figure 5A:
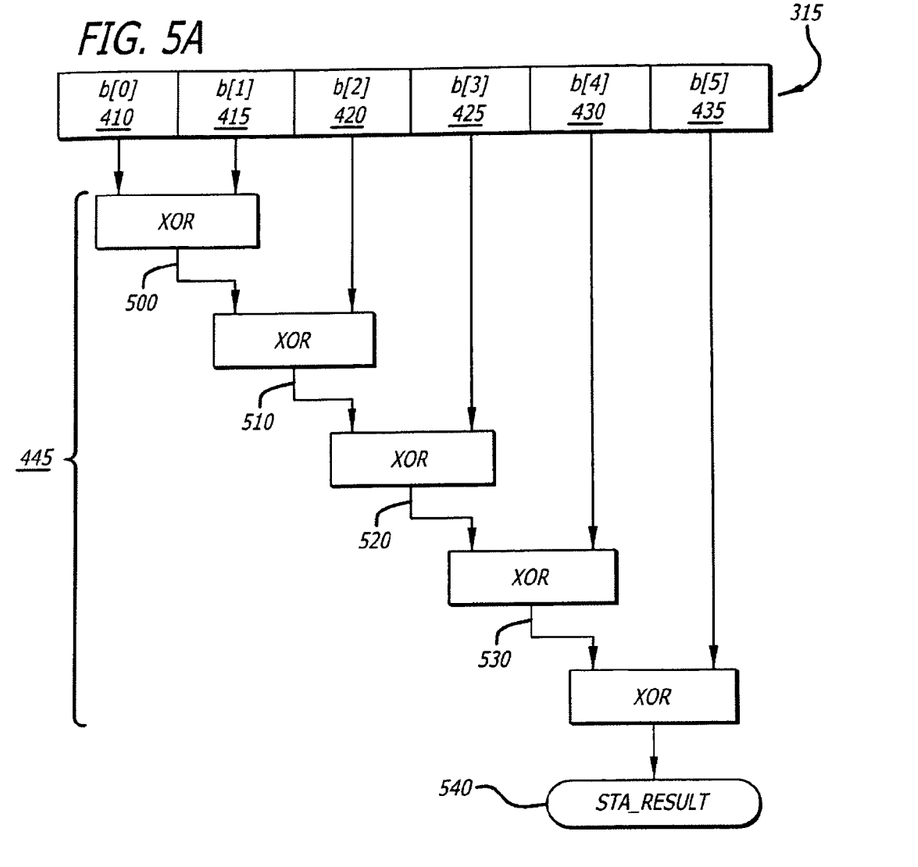
FIG. 5A is a first exemplary embodiment of a virtual local area network (VLAN) pooling operation performed by the network switch to generate a value (STA_RESULT) used for assigning a particular station to a particular VLAN of the VLAN pool.

Referring now to FIG. 5A, a first exemplary embodiment of a virtual local area network (VLAN) pooling operation that generates a value (STA_RESULT) used for assigning a particular device to a particular VLAN of a VLAN pool is shown.

A network switch (or AP) receives information contained in a wireless message originating from a particular STA, such as an Association Request, and extracts STA MAC address 315 that was contained within the MAC header of the wireless message. As shown, STA MAC address 315 includes six bytes represented as bytes b[0] 410, b[1] 415, b[2] 420, b[3] 425, b[4] 430 and b[5] 435 as set forth in FIG. 4A.

According to one embodiment of the invention, logical operations are performed on STA MAC address 315, such as byte-wise XOR operations on successive bytes of STA MAC address 315. More specifically, as illustrated in FIG. 5A, byte b[0] 410 is XOR'ed with byte b[1] 415 to produce a first intermediate result 500. First intermediate result 500 is XOR'ed with byte b[2] 420 to produce a second intermediate result 510. Similarly, byte b[3] 425 is XOR'ed with second intermediate result 510 to produce a third intermediate result 520, byte b[4] 430 is XOR'ed with third intermediate result 520 to produce a fourth intermediate result 530, and byte b[5] 435 is XOR'ed with fourth intermediate result 530 to produce a result value (STA_Result) 540.

In summary, the result of these XOR operations produces STA_Result 540, which may be equivalent to STA_Result value 445 of FIG. 4A.

Figure 5B:
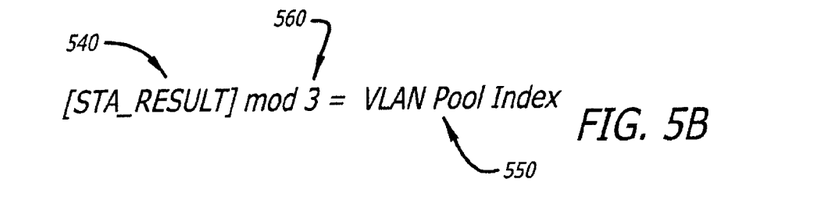
FIG. 5B is a first exemplary embodiment of a Modulo operation performed by the network switch to produce the VLAN pool index.

Referring now to FIG. 5B, a first exemplary embodiment of an operation performed by the switch to produce a VLAN Pool Index 550 using modulo functionality. Both STA_Result 540 and a value 560, representing the total number (M) of VLANs forming a VLAN pool, are loaded into logic that performs a Modulo operation (MOD) on values 540 and 560 as set forth in equation (1) above.

Figure 5C:
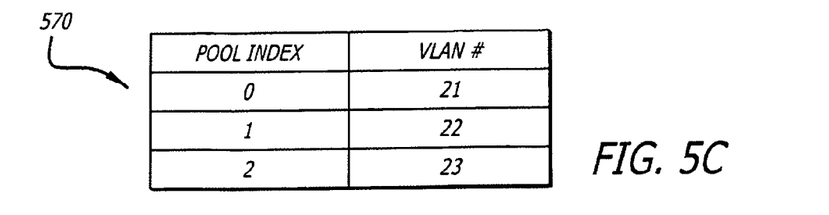
FIG. 5C is a first exemplary embodiment of VLAN Assignment table supporting three (3) VLANs.

As shown, the modulo operation performed by the logic produces VLAN Pool Index 550, which is equivalent to a remainder of STA_Result 540 divided by M, the total number of VLANs 560. Each unique value for VLAN pool index 550 corresponds to a selected VLAN from the VLAN pool, and the corresponding relationship is maintained by a VLAN Assignment table 570 set forth in FIG. 5C.

Figure 6:
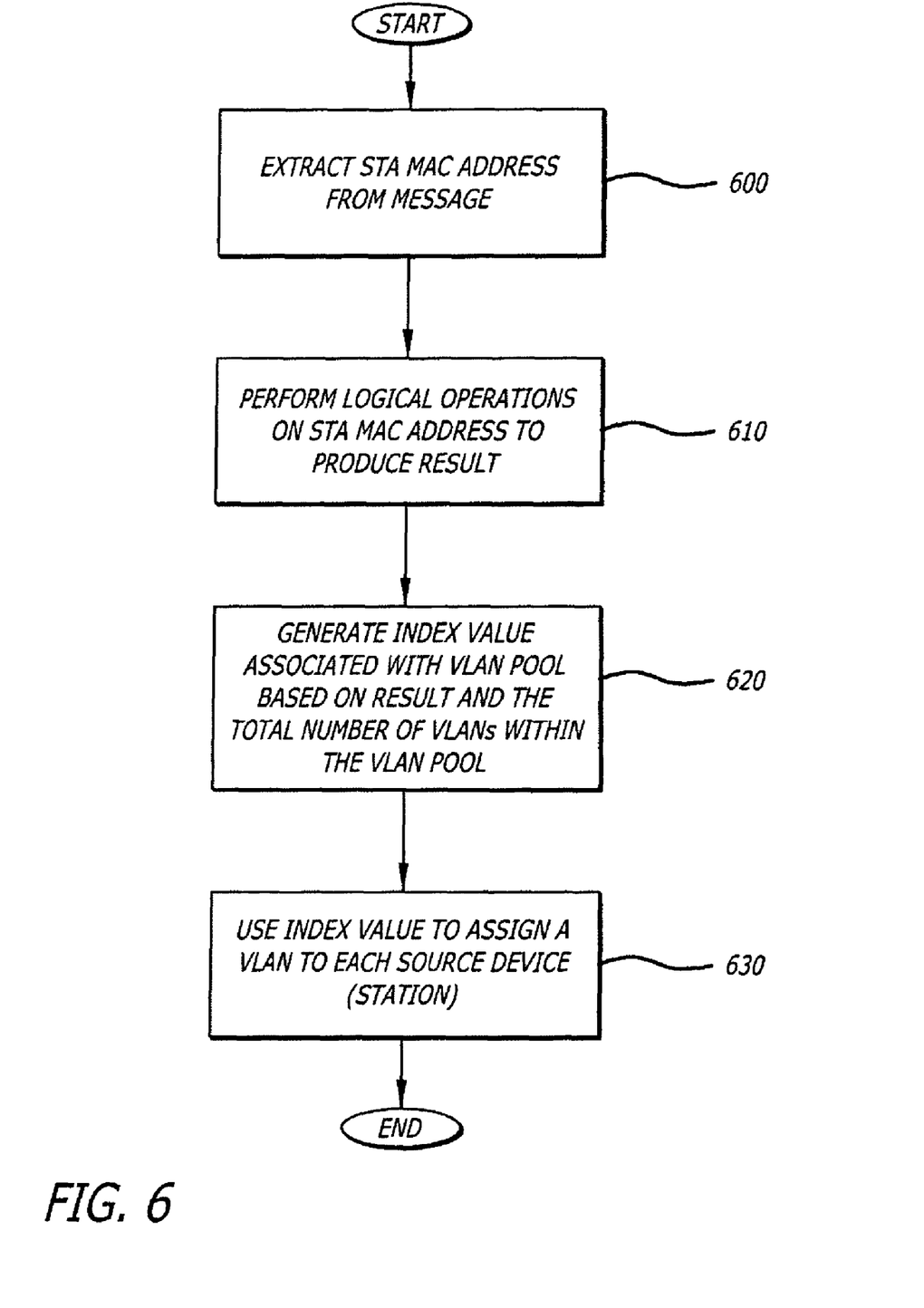
FIG. 6 is an exemplary embodiment of a method of operation for the network switch of FIG. 2.

Referring now to FIG. 6, an exemplary embodiment of a method of operation for network switch 200 of FIG. 2 is shown. First, upon receipt of information contained in wireless message from a station (STA), such as an Association Request for example, the network switch extracts the STA MAC address provided in the Association Request (block 600). Logical operations are performed on the STA MAC address to produce a result (block 610). According to one embodiment of the invention, the result is produced by conducting XOR operations on successive bytes and prior XOR computations (e.g., b[0] XOR b[1] XOR b[2] XOR b[3] XOR b[4] XOR b[5]). However, other types of logical operations may be performed on the STA MAC address to produce the result.

After the result is produced, as shown in block 620, the network switch conducts arithmetic operations on the result and the total number of VLANs within a VLAN pool established for the network in order to generate an index (VLAN Pool Index). As an illustrated example described above, the arithmetic operation may be a "Modulo" operation where each possible remainder is uniquely assigned to a particular VLAN of the VLAN pool. However, it is contemplated that other arithmetic operations may be performed.

The index is associated with the particular VLAN for assigning the STA to that VLAN. Hence, upon subsequent reception of a message for multicast or broadcast transmission from the STA, the network device uses the VLAN information to complete such transmissions to other network devices within the STA's VLAN (block 630). Moreover, the VLAN information may be used for unicast transmissions and the insertion of the VLAN identifier into the header of the outgoing message originating from the STA.

While the invention has been described in terms of several embodiments, the invention should not limited to only those embodiments described, but can be practiced with modification and alteration within the spirit and scope of the appended claims. The description is thus to be regarded as illustrative instead of limiting.

What is claimed is:

1. A method for forming groups of wireless network device within a network, comprising:
    obtaining, by a network device, a source media access control (MAC) address for a wireless network device;
    performing, by the network device, a logical operation on the source MAC address to produce a result;
    performing, by the network device, an arithmetic operation on the result and a total number of virtual local area networks to produce an index value, the index value being set to an integral value no greater than the total number of virtual local area networks; and
    assigning, by the network device, the wireless network device to a virtual local area network corresponding to the index value from a plurality of virtual local area networks.

2. The method of claim 1, wherein both operations of obtaining the source MAC address and assigning the wireless network device to the virtual local area network are conducted by an Access Point and during Association at which time the wireless network device is seeking to establish wireless communications with the Access Point.

3. The method of claim 2, wherein prior to obtaining the source MAC address, the method further comprises
    receiving a wireless message by the Access Point, the wireless message being transmitted from the wireless network device that is a wireless station; and
    transmitting a message to a network switch configured to obtain the source MAC address and assign the wireless station to the virtual local area network based on the source MAC address and the total number of virtual local area networks.

4. The method of claim 1, wherein the assigning the virtual local area network is conducted by an Access Point that receives a message from the wireless network device, the message includes the source MAC address.

5. The method of claim 1, wherein the arithmetic operation is a modulo operation.

6. The method of claim 1, wherein the performing of the logical operations further comprises:
    segmenting the source MAC address into a plurality of bytes; and
    conducting Exclusive OR (XOR) operations on the plurality of bytes in succession to produce the result.

7. The method of claim 1, wherein the performing of the logical operations further comprises:
    separating the source MAC address into a plurality of bit segments, each segment having a predetermined number of bits; and
    conducting Exclusive OR (XOR) operations on the plurality of bit segments in succession to produce the result.

8. The method of claim 1, wherein the assigning of the wireless network device to the virtual local area network is conducted during an Association phase being a time where the wireless network device is attempting to establish wireless communications with a network device being one of an Access Point and a network switch.

9. The method of claim 8, wherein the obtaining of the source MAC address for the wireless network device is conducted by extracting the source MAC address from an Association Request message that is used to establish communications with network device during the wireless association.

10. The method of claim 9, wherein the obtaining of the source MAC address for the wireless network device includes extracting the source MAC address from a wireless message during an Association phase where the wireless network device is seeking to establish wireless communications with a corresponding access point.

11. A non-transitory storage medium to contain software that is executed by a logical processing unit implemented within a first network device of a network, comprising:
    a first software module that, when executed by the logical processing unit, extracts a source media access control (MAC) address for a second network device from an incoming message during an Association phase being a time where the second network device is attempting to establish wireless communications with the first network device; and
    a second software module that, when executed by the logical processing unit, performs a logical operation on the source MAC address to produce a result, performs an arithmetic operation on the result and a total number of virtual local area networks to produce an index value, the index value being set to an integral value no greater than the total number of virtual local area networks, and assigns the second network device to a virtual local area network corresponding to the index value from a plurality of virtual local area networks.

12. The non-transitory storage medium of claim 11, wherein the stored software being executed by the logical processing unit implemented within an Ethernet switch being the first network device.

13. The non-transitory storage medium of claim 11, wherein the first network device containing the stored software is a network switch and the second network device is a station.

14. The non-transitory storage medium of claim 11, wherein the first network device containing the stored software is an Access Point and the second network device is a wireless station.

15. The non-transitory storage medium of claim 11, wherein the second software module (i) performing the logical operation being a logical operation on the source MAC address to produce the result, and (ii) performing the arithmetic operation being a modulo operation on the result and the total number of virtual local area networks in a virtual local area network (VLAN) pool to produce the index value.

16. In communication with a wireless station via an access point forming a network, a network switch comprising:
   a processor configured to (i) obtain a source MAC address of the wireless station from an incoming message from the wireless station during an initial operational phase at which the wireless station is attempting to establish wireless communications with the access point; and
   logic, implemented by the processor, to (i) perform a logical operation on the source MAC address to produce a result, (ii) perform an arithmetic operation on the result and a total number of virtual local area networks to produce an index value, the index value being set to an integral value no greater than the total number of virtual local area networks, and (iii) select a virtual local area network for the wireless station from a plurality of virtual local area networks, the virtual local area network corresponds to the index value that is computed using both the source MAC address and the total number of virtual local area networks.

17. The network switch of claim 16, wherein the logic performs the first operation on the source MAC address to produce the result by separating the source MAC address into a plurality of bytes, and performing Exclusive OR (XOR) operations on the plurality of bytes in succession to produce the result.

18. The network switch of claim 16, wherein the logic performs the first operation on the source MAC address to produce the result by separating the source MAC address into a plurality of bit segments with each bit segment being at least one bit in length, and performing Exclusive OR (XOR) operations on the plurality of bit segments in succession to produce the result.

19. The network switch of claim 18, wherein each of the plurality of bit segments is equal in size.

20. The network switch of claim 18, wherein the logic performs a Modulo operation as the arithmetic operation on the result and the total number of virtual local area networks to generate the index.

21. The network switch of claim 20, wherein the index value is assigned one of M−1 values when the total number of virtual local area networks is equal to M, each value being uniquely associated with one of the virtual local area networks.

22. The network switch of claim 16, wherein the logical processing unit to perform logical operations on the source MAC address contained within the incoming message being a message configured in accordance with an IEEE 802.11 communication protocol.

23. The network switch of claim 16, wherein the initial operational phase is an Association phase being a time where the wireless station is attempting to establish bidirectional wireless communications with the access point.

24. A method for forming groups of wireless network devices within a network, comprising:
   obtaining, by a network device, a source media access control (MAC) address for a wireless network device by an access point, the source MAC address being extracted from a wireless message for establishing wireless communications with the access point; and
   assigning, by the network device, the wireless network device to a virtual local area network (VLAN) using an index value, wherein the assigning of the wireless network device to the VLAN comprises:
      performing a logical operation on the source MAC address to produce a result,
      performing an arithmetic operation on the result and a total number of virtual local area networks in a VLAN pool to produce the index value, the index value being set to an integral value no greater than the total number of virtual local area networks, and
      using the index value to select the VLAN for the wireless network device from the VLAN pool, the VLAN pool comprises a plurality of virtual local area networks supported by the network and the VLAN is one of the plurality of virtual local area networks forming the VLAN pool.

25. The method of claim 24, wherein the performing of the logical operation on the source MAC address produces the result being different from the source MAC address in its entirety.

26. The method of claim 25, wherein prior to obtaining the source MAC address, the method further comprises
   receiving a wireless message from the wireless network device by an Access Point; and
   transmitting a message to a network switch configured to obtain the source MAC address and assign the wireless network device to the virtual local area network based on the source MAC address and the total number of virtual local area networks.

27. The method of claim 24, wherein the assigning the virtual local area network is conducted by an access point that obtains the source MAC address by extracting the source MAC address from a message sent by the wireless network device.

28. The method of claim 24, wherein the performing of the arithmetic operation during the assigning of the wireless network device to the virtual local area network comprises
   performing a modulo operation on the result and the total number of virtual local area networks to produce the index value.

29. The method of claim 24, wherein the performing of the logical operation further comprises:
   separating the source MAC address into a plurality of bit segments, each segment having a predetermined number of bits; and
   conducting Exclusive OR (XOR) operations on the plurality of bit segments to produce the result.

30. The method of claim 24, wherein the source MAC address is extracted from the wireless message being an Association Request message.

* * * * *